Nov. 26, 1957  E. G. CLARK ET AL  2,814,502
TORQUE AND LATERAL FORCE TRANSMITTING LINKAGE
FOR VEHICLE SUSPENSION
Filed Nov. 22, 1954  3 Sheets-Sheet 1

INVENTORS
Edmund G Clark
Glen D. Holmberg

BY
ATTORNEY

INVENTORS
Edmund G. Clark
Glen D. Holmberg
BY
ATTORNEY

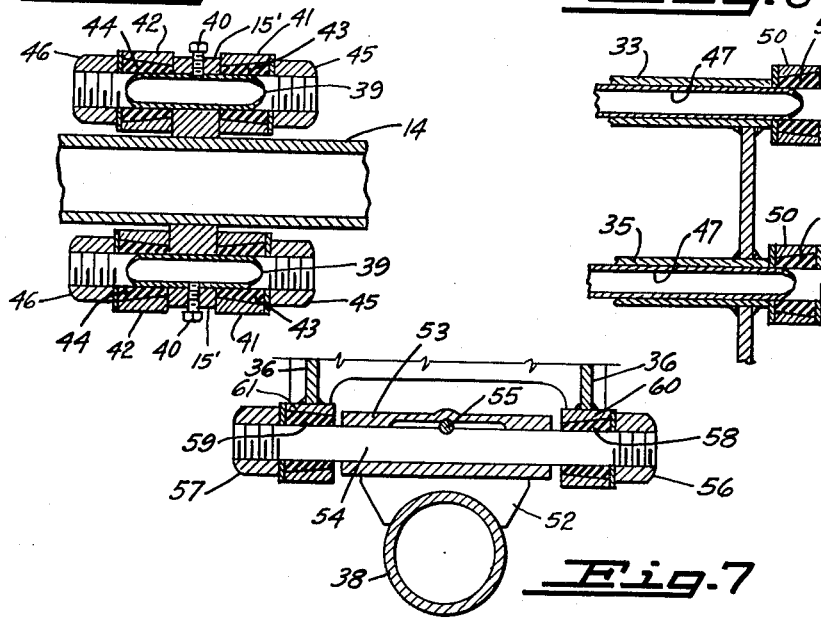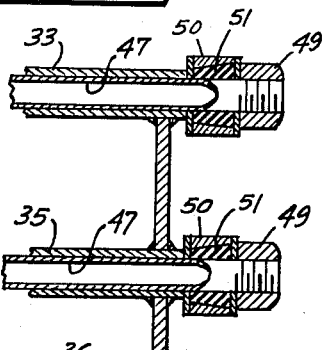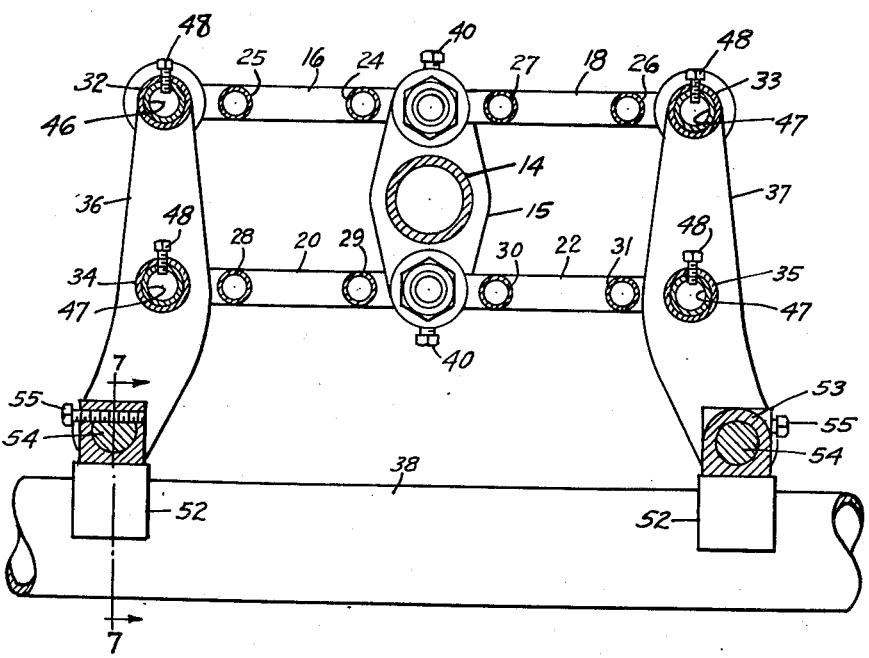

United States Patent Office 2,814,502
Patented Nov. 26, 1957

2,814,502

TORQUE AND LATERAL FORCE TRANSMITTING LINKAGE FOR VEHICLE SUSPENSION

Edmund G. Clark, Mountain View, and Glen D. Holmberg, San Mateo, Calif., assignors of one-half to Twenty-Five Associates, Inc., a corporation Application November 22, 1954, Serial No. 470,462

9 Claims. (Cl. 280—124)

This invention relates to a suspension device for the axles of vehicles, particularly heavily loaded vehicular axles, such as truck and trailer axles. It may be used in conjunction with pneumatic bellows type springs with which trucks, trailers and other vehicles are or may be equipped.

Within the last few years a pneumatic bellows type spring has to a large degree begun to replace the steel leaf-type spring for mounting a truck or trailer chassis upon the axle of the vehicle, a conventional mounting of this old leaf-type spring, comprising a series of flat strips of steel of progressively increasing length positioned one upon the other, the thickest part of the thus built-up leaf spring resting upon the axle and the two tapered ends of the leaf spring being secured, usually through a linkage arrangement, to the chassis. In the pneumatic bellows type spring a hollow bellows-like elongated flat bag structure made of rubber or similar elastic material is inflated with air and positioned between the axle and the truck chassis, so that the truck load bears directly upon the inflated bellows and the bellows in turn bears directly upon the axle, the bellows thus serving as a cushion between the truck load and the axle. In the case of a single axle truck mounting, the over-all dimensions of the bellows are generally in the neighborhood of six to eight inches from top to bottom, about the same dimension from side to side, and about two feet in length, there being one such bag on each side of the chassis—in other words, two for each axle. In the case of multiple axle units where, for example, a unit comprised of two axles (four wheels) carries the rear part of the chassis, or likewise carries a semi-trailer, one bag on each side of the chassis may still cushion the load upon the multiple axle unit, the length of the bag being increased accordingly. A flat plate is generally secured near each end of the axle, or axle unit in the case of multiple axles, on which the air bellows rests, and correspondingly a plate or other structure having a flat surface is provided underneath each side of the chassis, which bears upon the upper side of the bellows.

Accompanying these pneumatic bellows type springs, and connected therewith, is a pressure tank mounted in the vicinity of the bellows, which carries compressed air. By means of an automatic gauge or valve device in the conduit leading from the air pressure tank to each bellows, the air pressure within each bellows is kept automatically adjusted in accordance with the weight of the load carried by the truck. This same automatic adjustment of the air pressure carried by each bellows takes place as irregularities in the road surface produce vertical impacts upon the loaded bellows.

In the operation of vehicles equipped with pneumatic bellows type springs, other forces than the vertical forces which act upon the bellows while it is serving as a cushion between axle and truck load, come into play against the bellows. Among these other forces are those arising from driving torque, brake torque, and the centrifugal force that comes into play in going around curves during which the truck load tends to keep on in a straight line as the wheels of the truck proceed around the curve. An effect of brake torque, and likewise of driving torque, is that one end of the pneumatic bellows is subjected to a compressing or squeezing force and, simultaneously, the other end of the bellows to a stretching or pulling force. During brake torque, these forces are vice versa, as regards the two ends of the bellows upon which they are directed, to those during driving torque, but otherwise are of the same nature, and in both instances they tend to deform the bellows from its shape or shapes due to the vertical forces from the loaded truck and subject it to wear and tear. When the truck or trailer is heavily loaded and the brakes are applied suddenly, or the truck is started from rest quickly, these forces are of very great magnitude and the wear and tear upon the bellows is severe. Even under ordinary road and driving conditions they are to some degree almost constantly at work. As a result of the centrifugal force that comes into play in going around curves, severe stresses are set up which tend to distort the bellows in a lateral or transverse direction from its normal shape. Here, also, in the case of heavily loaded vehicles, the wear and tear action on the bellows becomes very severe.

It is an object of this invention to provide a suspension device connected between the chassis and the axle of a vehicle which is auxiliary or supplementary to a pneumatic bellows-type spring and which functions to relieve the bellows from the stress and strain created by driving torque and brake torque and thereby save the bellows the wear and tear due to these torques.

It is also an object of the invention that this same auxiliary suspension device shall function to take the lateral stresses arising from the centrifugal force which comes into play in going around curves as aforesaid and which arise from misalignment caused by other operating conditions, and thereby save the bellows from the wear and tear due to such lateral stresses.

It is a further and primary object of this invention that the said auxiliary suspension device shall possess a flexibility which will permit it to function to accomplish the above stated objects without interference with the function of the pneumatic bellows to serve as a cushion to take the vertical forces due to the weight of the loaded truck upon the truck axles.

The essential features of the invention involved in carrying out the objects indicated are susceptible to modification, but a preferred embodiment of the invention is shown in the accompanying drawings, in which:

Fig. 4 is a cross-sectional view taken on line 4—4 of Fig. 1.

Fig. 5 is a cross-sectional view on line 5—5 of Fig. 1.

Fig. 6 is a cross-sectional view on line 6—6 of Fig. 3.

Fig. 7 is a cross-sectional view on line 7—7 of Fig. 4.

Figure 1:
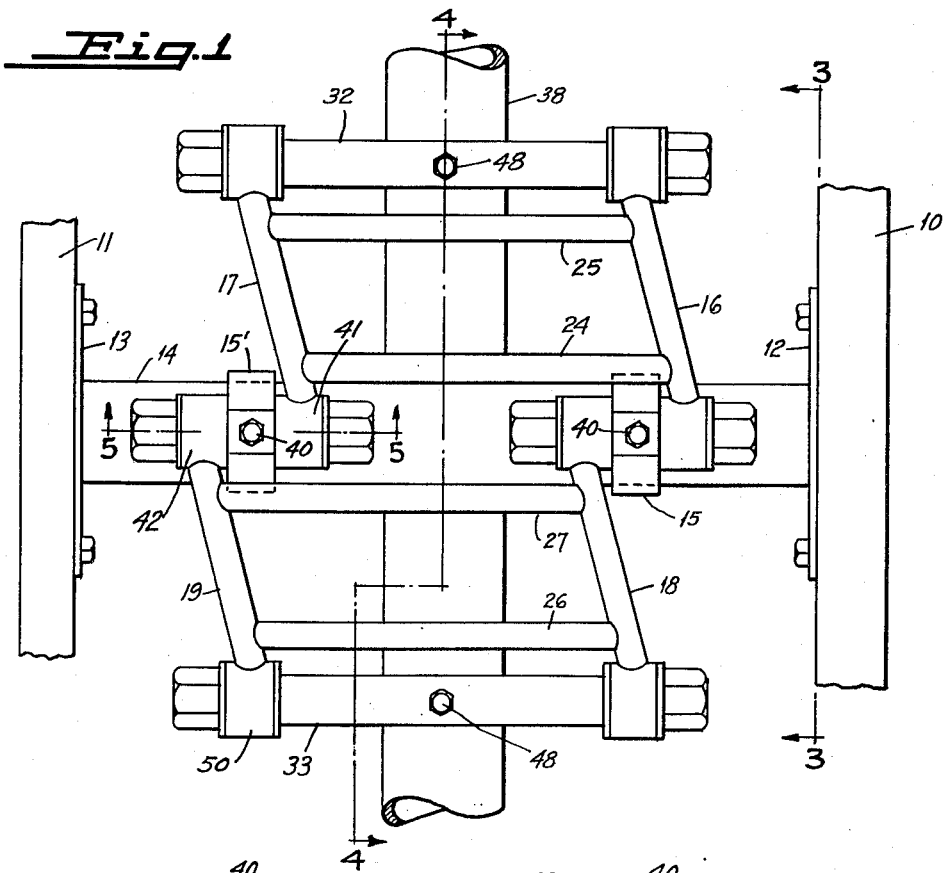
Fig. 1 is a top plan view of one form of the suspension device, showing also a portion of the two transverse members of the chassis frame to which the device is attached, and a portion of the axle housing underneath the device.

Referring to the drawings, reference numeral 10 designates a transverse member of a truck or trailer chassis frame, and 11 designates another such transverse chassis frame member, these two transverse members being positioned at approximately equal distances rearwardly and forwardly, respectively, from the truck axle (more specifically from the vertical plane through the longitudinal axis of the axle) to which the suspension device is attached. Rigidly secured to the transverse members 10 and 11 are plates 12 and 13, respectively, and extending from plate 12 to plate 13 and rigidly secured thereto, as by welding, is a structural member 14, which desirably may be a heavy pipe, the longitudinal axis of said member 14 being parallel to and lying in the vertical plane passing through the longitudinal axis of the vehicle when said vehicle is in its normal position on a level road. Rigidly secured (as by welding) to member 14 are two heavy brackets 15 and 15', one rearward and the other forward from the truck axle as viewed looking down on the vehicle. These brackets extend above and below member 14 (Fig. 4), and their longitudinal (verical) axes lie in the aforesaid vertical plane in which lies the axis of member 14.

Hingedly mounted to the upper ends of the two brackets 15 and 15' so as to swing up and down on the right hand side of the center line of the chassis, are arms 16 and 17, the hinge details being explained later. Similarly, mounted to the upper ends of the two brackets 15 and 15', are arms 18 and 19, which are swingable up and down on the opposite or left hand side of the center line of the chassis.

Likewise, two lower arms (positioned below upper arms 16 and 17, one such lower arm 20 being seen in Figs. 3 and 4, the other being directly back of arm 20 and not shown) are hingedly mounted to the lower ends of the two brackets 15 and 15' (see Fig. 4) to swing up and down on the right hand side of the center line of the chassis, and two lower arms (positioned below upper arms 18 and 19, one such lower arm 22 being seen in Figs. 3 and 4 and the other not shown) are hingedly mounted to the lower ends of the two brackets 15 and 15' to swing up and down on the left hand side of the chassis. Details of the hinge construction are shown later. All axes about which the said arms are hinged are parallel to the longitudinal axis of the vehicle. Preferably, and as shown in the drawings, all four upper arms, the two on the right hand side and the two on the left hand side, are hinged about a common axis, the four lower arms also being hinged about a common axis. When the arms on the right hand side and the corresponding arms on the left hand side are not hinged about a common axis, the respective separate axes would necessarily be to the right and the left of the center line of the vehicle and may be located in a single framework structure rigidly secured to the chassis, or in any suitable separate structures rigidly secured to the chassis, so long as the parallelism of said axes to the longitudinal axis of the vehicle, as just hereinabove stated, is maintained.

Due to the particular hinge construction (later explained) employed in our preferred embodiment, and so that the hinge members at the outer ends of the arms and the hinge joints on brackets 15 and 15' may all be in alignment, these arms are at an oblique angle to the longitudinal axes of the structure. Other angles may be employed as desired. Upper arms 16 and 17 are rigidly connected together by brace members 24 and 25 so that the two arms and the two brace members together constitute a rigid frame-work unit. Similarly, upper arms 18 and 19, with brace members 26 and 27 rigidly attached thereto, constitute a rigid frame-work unit. In like manner brace members 28 and 29 (seen in cross section in Fig. 4) connect lower arms 20 and 21; and brace members 30 and 31 connect lower arms 22 and 23 forming like rigid frame-work units.

Member 32 is hingedly attached to the outer ends of both upper arms 16 and 17 and is positioned so that the axis on which it may turn with respect to the two said arms is parallel to the axis passing through the upper ends of brackets 15 and 15' on which these same two upper arms may turn. Similarly, member 33 is attached to upper arms 18 and 19. Directly below members 32 and 33, respectively, are members 34 and 35 (seen in cross-section in Fig. 4) which are similarly hingedly attached to lower arms 20 and 21 and lower arms 22 and 23, respectively. Strut member 36 (see Figs. 3 and 4) is rigidly attached (as by welding) to both of the members 32 and 34, so that this strut and the upper and lower members 32 and 34 constitute one solid piece, the members 32 and 34 being so positioned when thus attached that their respective axes on which the arms attached to them are hinged are the same distance apart as are the axes passing through the upper and lower ends of brackets 15 and 15' on which the same arms are hinged. Strut member 37 is similarly rigidly attached to both the members 33 and 35 so that it and the upper and lower members 33 and 35 constitute one solid piece, with the two axes on which the arms attached to members 33 and 35 are hinged the same distance apart as are the two axes passing through the upper and lower ends of brackets 15 and 15' on which the same arms are hinged.

Figure 2:
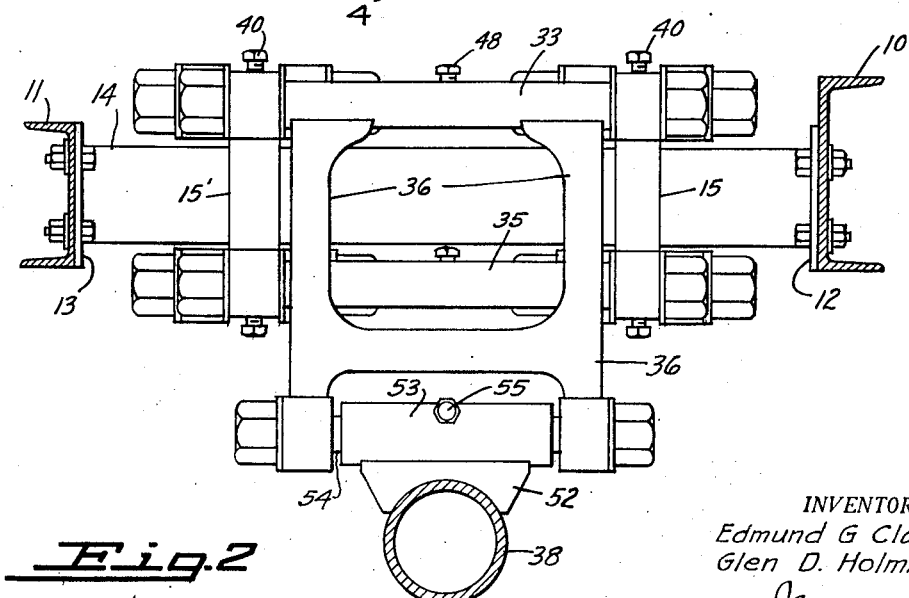
Fig. 2 is a side view of the suspension device shown in Fig. 1, the transverse members of the chassis frame to which the device is attached being shown in section, and the axle housing to which the device is also attached being also shown in section.
Figure 3:
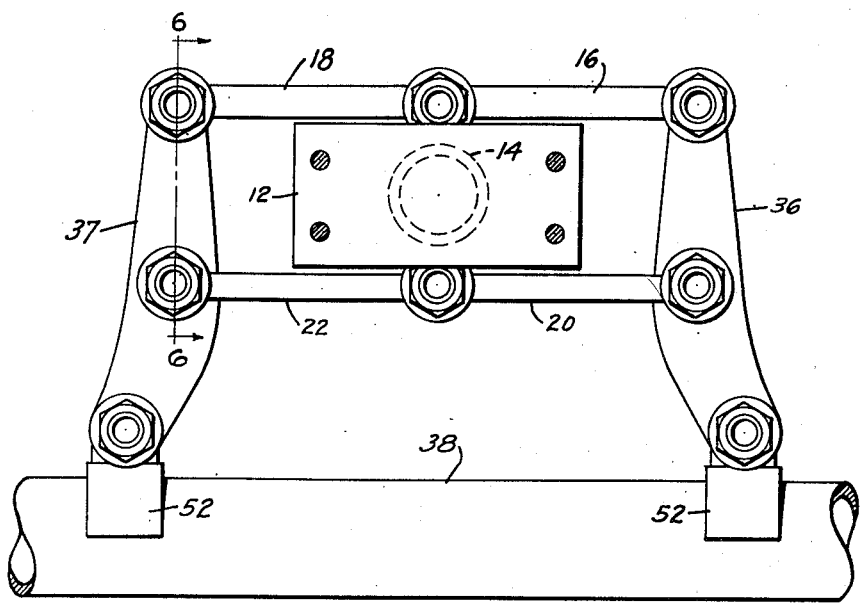
Fig. 3 is an end view of the device as shown in Fig. 1, taken on line 3—3 of Fig. 1.

As seen from Figs. 3 and 4, and also from Fig. 2, strut members 36 and 37 extend downwardly beyond where they are attached to members 34 and 35. At their lower ends they are hingedly attached to the vehicle axle 38. The means by which this attachment is made is hereinafter described.

Referring next to the different hinge structures: Fig. 5, which is a cross-section on line 5—5 in Fig. 1, shows in detail the arrangement of parts by which the aforesaid upper and lower arms are hingedly connected to the bracket members 15 and 15'. The upper and lower hinged structures shown in Fig. 5 are identical with each other and accordingly the same reference numerals are used for like parts in both of the hinge structures shown in Fig. 5. A pipe 39 extends through bracket 15' and is fitted with a hole through its wall which is adapted to receive the end of bolt 40 carried by said bracket whereby pipe 39 is prevented from turning within the said bracket. Bosses 41 and 42, to which are rigidly secured arms 17 and 19 respectively, as seen in Fig. 1, are positioned around pipe 39 and are adapted to receive tapered bushings 43 and 44, made of hard rubber or other suitable resilient material. Pipe 39 is threaded on each end to receive nuts 45 and 46, and these nuts are turned firmly against bushings 43 and 44, so as to wedge the latter against bosses 41 and 42. By this arrangement the structure becomes a rather stiffly hinged point and is in reality a hinged joint to the extent that as force is exerted upwardly or downwardly upon the arms rigidly connected to bosses 41 and 42, the rubber bushings 43 and 44 yield to the resulting torsion or twisting. By the pressure exerted against said rubber bushings by said nuts the joint can be adjusted to give the desired resistance to turning, while at the same time permitting the desired hinged movement of the arms with respect to said brackets 15.

The hinge joints by which the outer ends of the aforesaid arms are attached to members 32, 33, 34 and 35 are all identical with each other, the arrangement of parts being somewhat similar to those that make up the hinge joints by which the arms are attached to brackets 15 and 15'. Fig. 6, which is a cross-section on line 6—6 of Fig. 3, shows the arrangement for two of these joints, the same reference numeral being used in most instances for like parts. A pipe 47, positioned within member 33 (which desirably is also a pipe) and held rigidly with respect to member 33 by bolt 48 (seen in Figs. 1 and 2), protrudes at each end beyond the ends of member 33 and is threaded to receive nut 49, another such pipe being similarly positioned within member 35. Boss 50, to which is rigidly secured arm 19 (shown in Fig. 1) is positioned around pipe 47, and is adapted to receive tapered resilient bushing 51 positioned around pipe 47, which bushing is wedged against boss 50 by nut 49 to give the desired stiffness to the joint, while at the same time permitting hinge movement of arm 19 with respect to member 33.

The hinge connection of strut members 36 and 37 to axle 38 is shown in Fig. 7, which is a cross-section on line 7—7 of Fig. 4. To blocks 52, welded to axle 38, pipe 53 is rigidly secured, within which is positioned rod 54 held to pipe 53 by bolt 55, the shank of which acts as a key to prevent rod 54 from turning in pipe 53. For the reason hereinafter explained rod 54 is bare for an appreciable distance between pipe 53 and bosses 60 and 61. Rod 54 is threaded on each end to receive nuts 56 and 57, which compress tapered bushings 58 and 59 against bosses 60 and 61 to which is rigidly secured strut members 36. Here, as in the other hinge constructions previously explained, the strut member 36 is capable of being moved about the axis of rod member 54 to the extent that the torsion and twisting of the bushings 58 and 59 take place.

Figure 8:
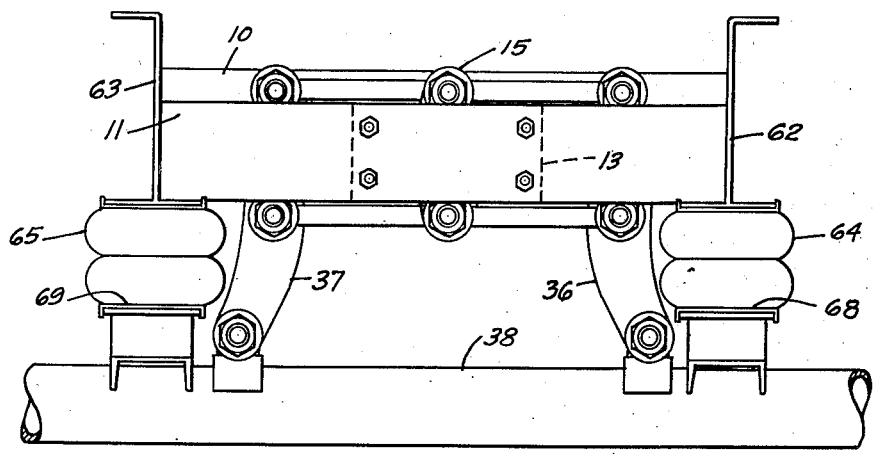
Fig. 8 is an end elevational view showing conventional air bellows springs in place between the chassis frame and truck axle; also the suspension device of our invention mounted on the truck axle.

The relative position of the suspension device of our invention to the air bellows of the vehicle may be seen in the end view of the vehicle, as shown in Fig. 8. Flat surfaces of the longitudinal chassis frame members 62 and 63 on each side of the chassis rest upon air bellows 64 and 65, which in turn rest upon plate structures 68 and 69 secured to axle 38. Positioned between the two said air bellows and connected to the axle 38 as hereinbefore explained are the strut members 36 and 37 of our suspension device, which latter is in turn connected to the transverse chassis frame members 10 and 11 (frame member 11 being seen in this Fig. 8, the other being directly behind it), through plates 12 and 13 secured to said chassis frame members as hereinbefore explained.

It has hereinabove been explained that arms 16 and 17 together with the brace members 24 and 25 rigidly secured to them constitute a rigid framework unit; and that likewise the other sets of arms, 18—19, 20—21 and 22—23 and their respective brace members each constitute a separate rigid framework unit. It will be noted that brackets 15 and 15' taken in conjunction with the member 14 to which they are rigidly attached also constitute a separate rigid framework unit; also, that members 32 and 34 together with strut member 36 constitute another separate rigid frame structure; and that members 33 and 35 together with strut member 37 constitute still another separate rigid framework unit. It will be noted (a) that the right hand upper arm framework unit (arms 16—17 and their brace members 24—25), (b) the right hand lower arm framework unit, (c) the framework unit composed of members 32 and 34 and strut 36, and (d) the framework unit composed of brackets 15 and 15' and member 14, all taken together, constitute on the right hand side of the center line of the vehicle the four sides of a cage-like structure hinged along its four corners with side (d) rigidly secured to, and forming in effect a part of, the chassis of the vehicle by reason as above described, of the rigid attachment of member 14 to plates 12 and 13, which in turn are secured to chassis members 10 and 11. It will further be noted that the outer side (c) of this cage-like structure is, through the hinge structures described, movable upwardly and downwardly with respect to said inner side, and that in all such movements the lines extending through adjacent axes on which the four sides are hinged always define a parallelogram. Since side (c) is in turn connected to the axle near its right hand end all movements of the right hand wheel of the vehicle over irregularities in the road surface will transmit a vertical or up and down movement to side (c) of the cage-like structure without interfering with the up and down movements of the air bellows on that side of the axle while said bellows is acting as a cushion between truck load and axle to take the vertical load and impact forces. The analogous situation exists with respect to the counter-part cage like structure on the left hand side of the center line of the vehicle. The length of each cake-like structure may approximate twice its width, while the depth is accommodated to the available space in relationship to the chassis and axle of the vehicle, a desirable but not necessary depth of the cage-like structures being somewhat less than their width. These dimensions may be varied depending upon the magnitude of the forces creating wear and tear to the pneumatic bellows which the pair of cage-like structures is to absorb and transmit into the chassis of the vehicle.

It will be further observed, however, that with respect to lateral forces which come into play, such as in rounding curves on the road, wherein, as the wheels proceed around the curve and the loaded chassis tends to continue on in a straight line and to tear away from the air bellows cushions, as the axle moves laterally a lateral force is applied to the lower ends of strut members 36 and 37 causing either or both struts to act as levers, and whether the lever is considered fulcrumed at the upper or lower hinge on the strut member, the upper arm frame unit opposes the lower arm frame unit so that lateral movement of the lower ends of the struts with respect to brackets 15 and 15', and therefore with respect to the chassis, is impossible and therefore the chassis moves laterally along with lateral movements of the axle (the loaded chassis must "keep up with the axle" in rounding a curve, etc.), thus relieving the air bellows of lateral stresses, leaving them to function as cushions between load and axle.

It will be still further observed that by reason of the said cage-like structures having a substantial longitudinal dimension in the direction of the longitudinal axis of the vehicle and its chassis, and the rigid attachments of the cage-like structures to the chassis, the torque forces, both from driving and from braking, which the axle would otherwise throw against the air bellows, is substantially all taken by the said cage-like structures and transmitted into the chassis, thereby relieving the bellows from wear and tear of stresses arising from brake and driving torque. And, as pointed out above, all this saving of wear and tear upon the air bellows from torque forces and lateral forces is, by reason of the flexibility permitted by the hinged construction described, accomplished while not interfering with the cushioning function of the bellows.

By reason of the clearance between pipe 53 and bosses 60 and 61 (see Fig. 7) any misalignment of the axle resulting from the factory construction of the vehicle may readily be corrected by our device by loosening one of nuts 56 and 57 and tightening the other. Through this adjustment the rod 54 and that end of axle 38 to which it is rigidly attached is moved either forward or backward with respect to the chassis. Likewise a similar adjustment may be made on the other side of the vehicle where the other strut member (37) is hingedly connected to the axle.

In the case of multiple axle units such as exist on heavy trucks and trailers it is desirable that one of our devices be used in connection with each single axle of the multiple axle unit.

It is obvious that modifications and changes could be made in the foregoing illustrations of a preferred embodiment of our invention without departing from the invention, and all such alterations and variations that come within the scope of the appended claims are considered to be embraced thereby.

We claim:

1. A vehicle axle suspension device comprising a pair of elongated, four-sided, cage-like structures open at both ends and having in general outline the shape of a hollow prism, and provided with hinged means at each of its four corners whereby the opposing sides of each cage-like structure are movable with respect to each other but always in parallel relationship, the pair being positioned above an axle of said vehicle with each cage-like structure of said pair being positioned one on each side of and equidistant from the longitudinal center line of the chassis of said vehicle with its longitudinal axis parallel to the longitudinal axis of said chassis, and with one of its four sides facing the vertical plane in which the centerline of the chassis lies, the two sides of said structures thus facing said vertical plane having the same but opposing relative position with respect to said plane when said vehicle is in its normal position on level terrain, the longer dimension of each cage-like structure being sufficient that it extends a substantial distance both fore and aft of said axle, means whereby the said two sides of said structure facing said vertical plane are in fixed and rigid relationship to said chassis, and means whereby the outer side of each cage-like structure is hingedly attached to said axle.

2. A vehicle axle suspension device in accordance with claim 1 in which at least one of the hinge means comprises a spindle-like member in fixed engagement with one of the said framework units, a boss in fixed engagement with the other of said framework units, and positioned around said spindle member and adapted to turn on said spindle member, a bushing of resilient material positioned on said spindle member adjacent said boss and means whereby said bushing may be compressed against said boss to such extent that the hinge movement is confined to the tortion and twisting of said bushing.

3. A vehicle axle suspension device in accordance with claim 1 in which the means by which at least one of said outer sides is hinged to said axle comprises a spindle member in fixed engagement with said axle, a pair of bosses in fixed engagement with said outermost framework unit and positioned around said spindle member and adapted to turn on said spindle member, a bushing of resilient material positioned on said spindle member adjacent each said boss, a nut on said spindle member adjacent each boss whereby said bushing may be compressed against its adjacent boss to such extent that the hinge movement is confined to the tortion and twisting of said bushing, a part of said spindle member adjacent each said boss being bare and unobstructed whereby upon loosening one nut and tightening the other nut the said spindle member in fixed engagement with said axle is moved in either direction fore or aft carrying with it that end of the said axle to which it is attached to correct for any misalignment in the construction of the said vehicle.

4. A vehicle suspension device in accordance with claim 1 in which the pair of cage-like structures have their inner, i. e., adjacent sides in common, means whereby said side common to both of said pair of cage-like structures is rigidly attached to the chassis of said vehicle, said side being positioned vertically and on the center line of the chassis.

5. A vehicle axle suspension device for trucks and similar vehicles which serves both to prevent lateral movement of the loaded chassis with reference to the axle and to transmit to the chassis frame the torque forces resulting from driving and braking, which comprises a first pair of rigid oblong-shaped framework units positioned horizontally, apart, one above the other, and above said axle with their longitudinal axes parallel to the longitudinal axis of said vehicle and with the entire part of said framework units on the right hand side of the centerline of said vehicle, the longer dimension of said framework units being sufficient that said units extend a substantial distance both fore and aft of said axle, a second pair of rigid oblong-shaped framework units of similar shape and size and similarly positioned on the left hand side of the centerline of said vehicle, a central rigid framework structure positioned vertically on the longitudinal centerline of said vehicle and above the axle thereof and extending a substantial distance both fore and aft of said axle, said central framework structure being rigidly secured at its two ends to the chassis of said vehicle, means whereby the inner side of each of the four oblong-shaped, horizontally positioned framework units is hingedly attached, at its forward and rearward ends, to said central rigid framework, two outer rigid framework structures positioned vertically, one adjacent the outer sides of the upper and lower oblong-shaped framework structures of each of said first and second pairs of framework units, means whereby each of said two outer framework structures is hingedly attached to the adjacent upper and lower oblong-shaped framework units to form two elongated four-sided, cage-like structures, one on the right hand side and one on the left hand side of the vehicle, over the axle and extending a substantial distance both fore and aft of said axle, each said cage-like structure being hinged at its four corners, the axes of the four hinged connecting means being so positioned that in any cross-section through said elongated cage the straight lines extending through the axes of said hinged means always form a parallelogram, and means whereby each of said outer framewrok structures is hingedly attached to said axle at the end of said axle adjacent said outer framework structure.

6. A vehicle axle suspension device in accordance with claim 5 in which at least one of the means by which the said framework structures are hinged comprises a spindle-like member in fixed engagement with one of the said framework units, a boss in fixed engagement with the other of said framework units and positioned around said spindle member and adapted to turn on said spindle member, a bushing of resilient material positioned on said spindle member adjacent said boss and means whereby said bushing may be compressed against said boss to an extent that the hinge movement is confined to the tortion and twisting of said bushing.

7. A vehicle axle suspension device in accordance with claim 5 in which the means by which at least one of said outer framework structures is hinged to said axle comprises a spindle member in fixed engagement with said axle, a pair of bosses in fixed engagement with said outer framework structure and positioned around said spindle member and adapted to turn on said spindle member, a bushing of resilient material positioned on said spindle member adjacent each said boss, a nut on said spindle member adjacent each said boss whereby said bushings may be compressed against said bosses to an extent that the hinge movement is confined to the tortion and twisting of said bushings, a part of said spindle member adjacent each said boss being bare and unobstructed whereby upon loosening one nut and tightening the other nut the said spindle member is moved in either direction fore or aft carrying with it that end of said axle to which it is attached to adjust the alignment of said axle with respect to said vehicle.

8. A vehicle axle suspension device in accordance with claim 5 in which the means by which at least one of said outer framework structures is hinged to said axle comprises a spindle member in fixed engagement with said axle, a boss in fixed engagement with said outer framework structure and positioned around said spindle member and adapted to turn on said spindle member, a bushing of resilient material positioned on said spindle member adjacent said boss, means whereby said bushing may be compressed against said boss to constrain the hinge movement, and means whereby said boss may be moved longitudinally with reference to said spindle member to adjust the alignment of said axle with respect to said vehicle.

9. A vehicle axle suspension device for trucks and similar vehicles which serves both to prevent lateral movement of the loaded chassis with reference to the axle and to transmit to the chassis frame the torque forces resulting from driving and braking, which comprises a first pair of rigid oblong-shaped framework units positioned horizontally, apart, one above the other, and above said axle with their longitudinal axes parallel to the longitudinal axis of said vehicle and with the entire part of said framework units on the right hand side of the centerline of said vehicle, the longer dimension of said framework units being sufficient that said units extend a substantial distance both fore and aft of said axle, a second pair of rigid oblong-shaped framework units of similar shape and size and similarly positioned on the left hand side of the centerline of said vehicle, means whereby the forward and rearward ends of the inner side of each of said four oblong-shaped horizontally-positioned framework units are coaxially and hingedly in attached engagement with the chassis frame of said vehicle, two outer rigid framework structures positioned vertically, one adjacent the outer sides of the upper and lower oblong-shaped framework structures of each of said first and second pairs of framework units, means whereby each of said two outer framework structures is hingedly attached to the adjacent upper and lower oblong-shaped framework units to form two elongated four-sided, cage-like structures, one on the right hand side and one on the left hand side of the vehicle, over the axle and extending a substantial distance both fore and aft of said axle, each said cage-like structure being hinged at its four corners, the axes of the four hinged connecting means being so positioned that in any cross-section through said elongated cage the straight lines extending through the axes of said hinged means always form a parallelogram, and means whereby each of said outer framework structures is hingedly attached to said axle at the end of said axle adjacent said outer framework structure.

References Cited in the file of this patent

UNITED STATES PATENTS 944,426     Fulton _____ Dec. 28, 1909